Figure 1:
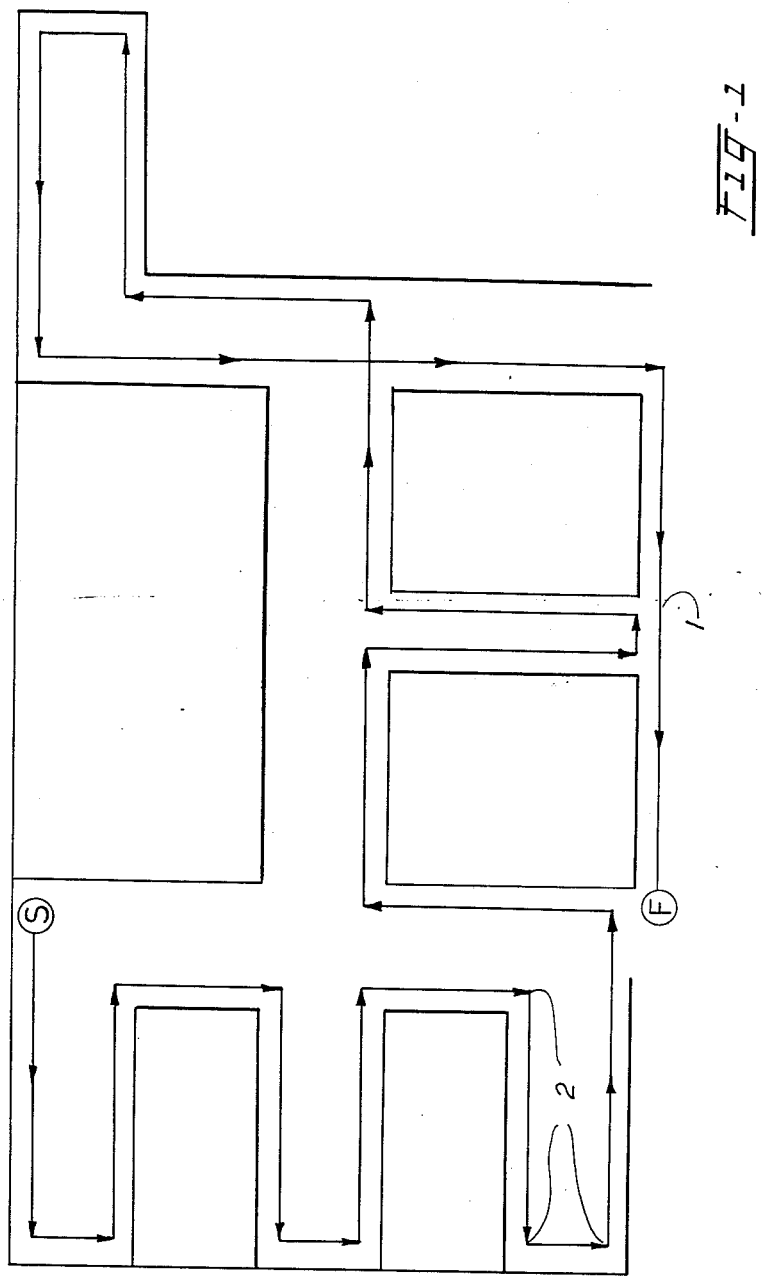

Aug. 10, 1965   M. M. LEVY   3,199,688
APPARATUS FOR SORTING FLAT ARTICLES
Original Filed Feb. 8, 1961   18 Sheets-Sheet 1

INVENTOR
MAURICE M. LEVY

BY Stevens, Davis, Miller + Mosher
ATTORNEYS

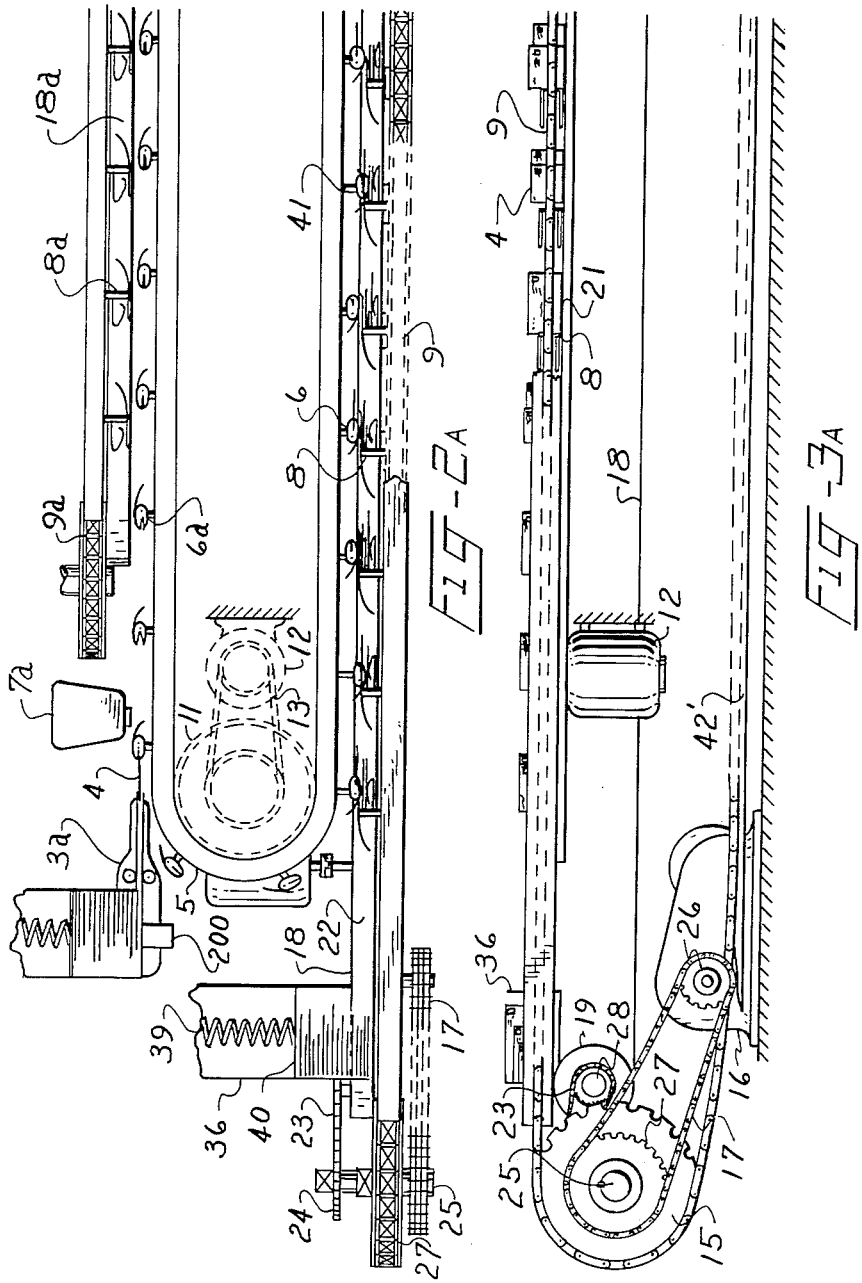

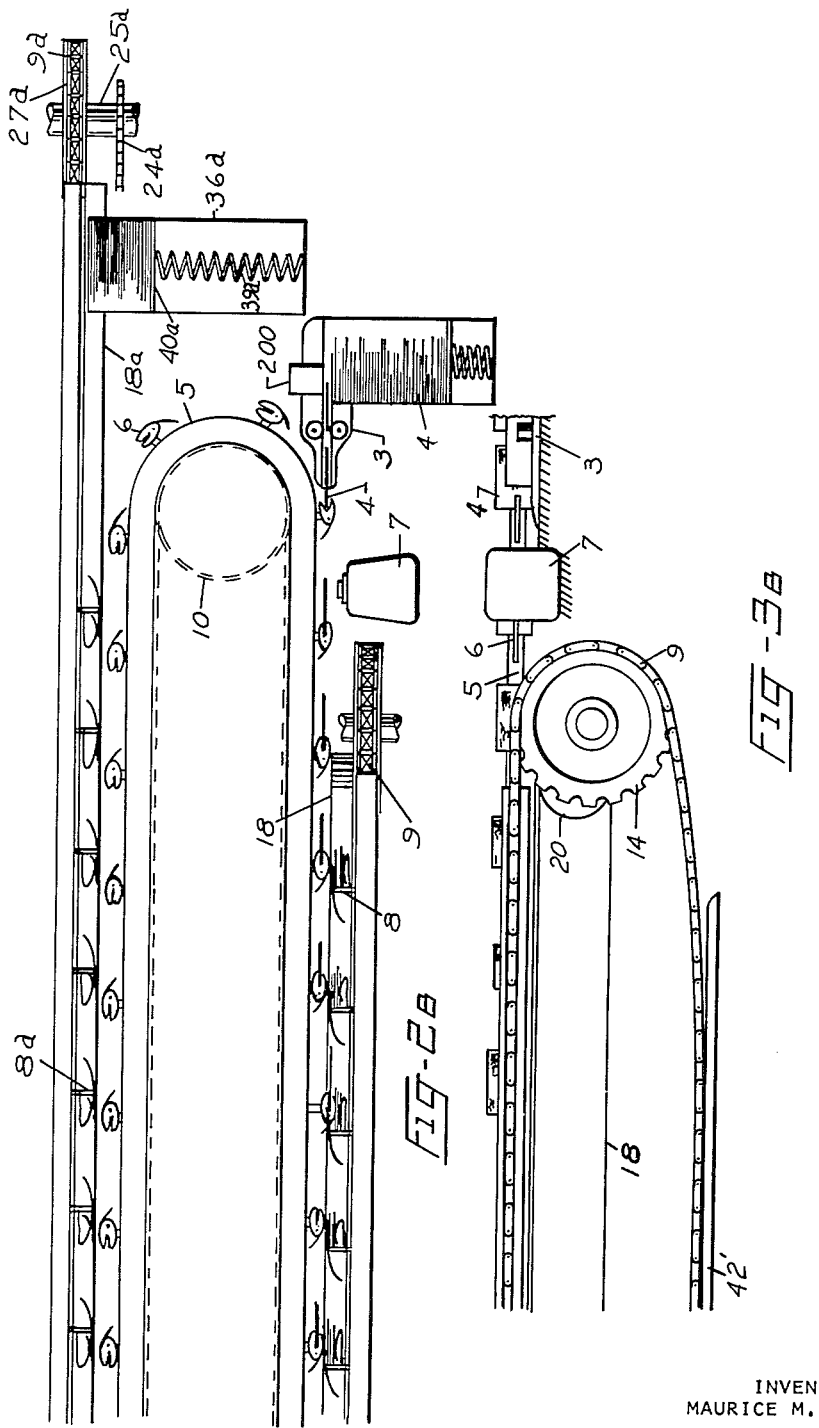

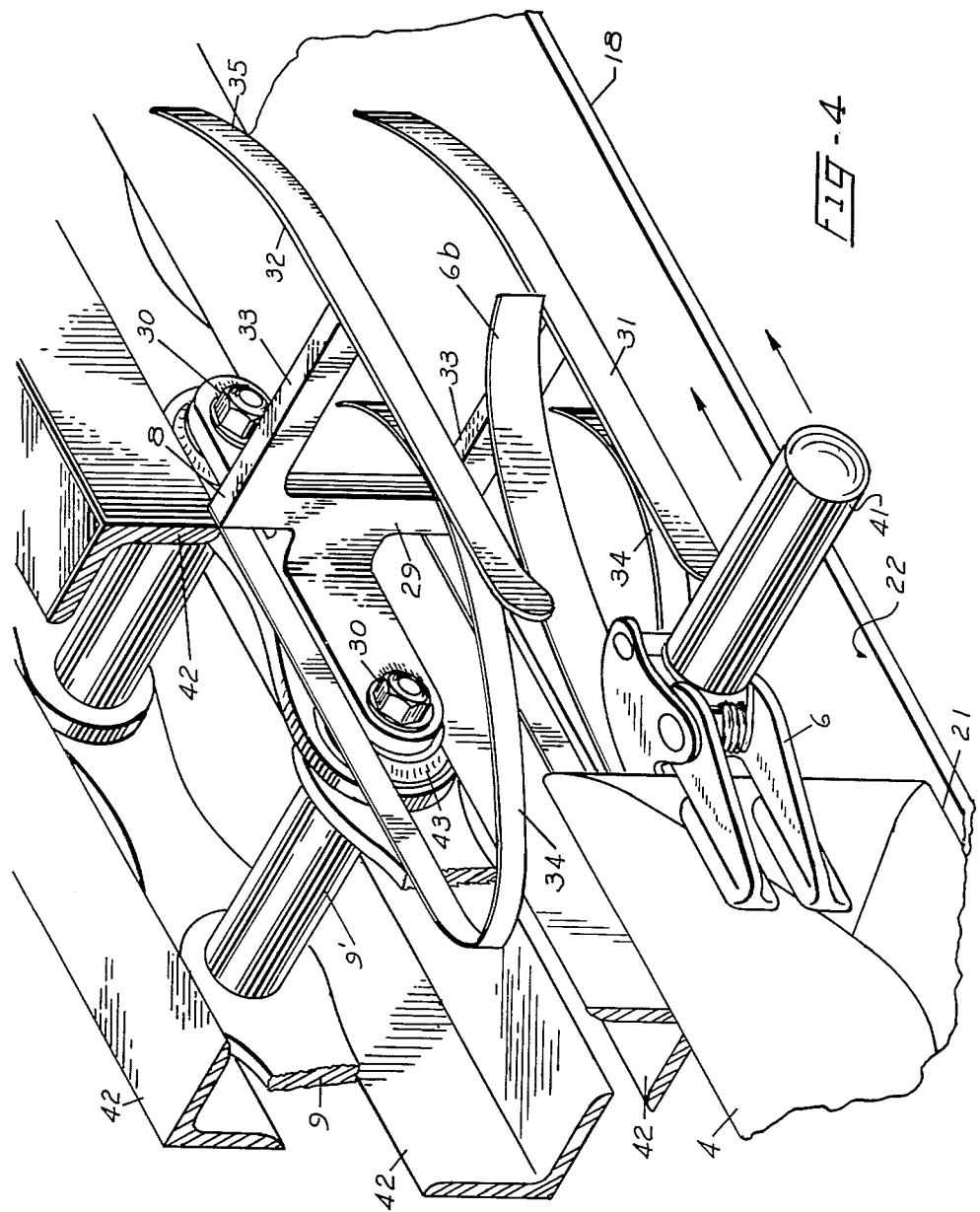

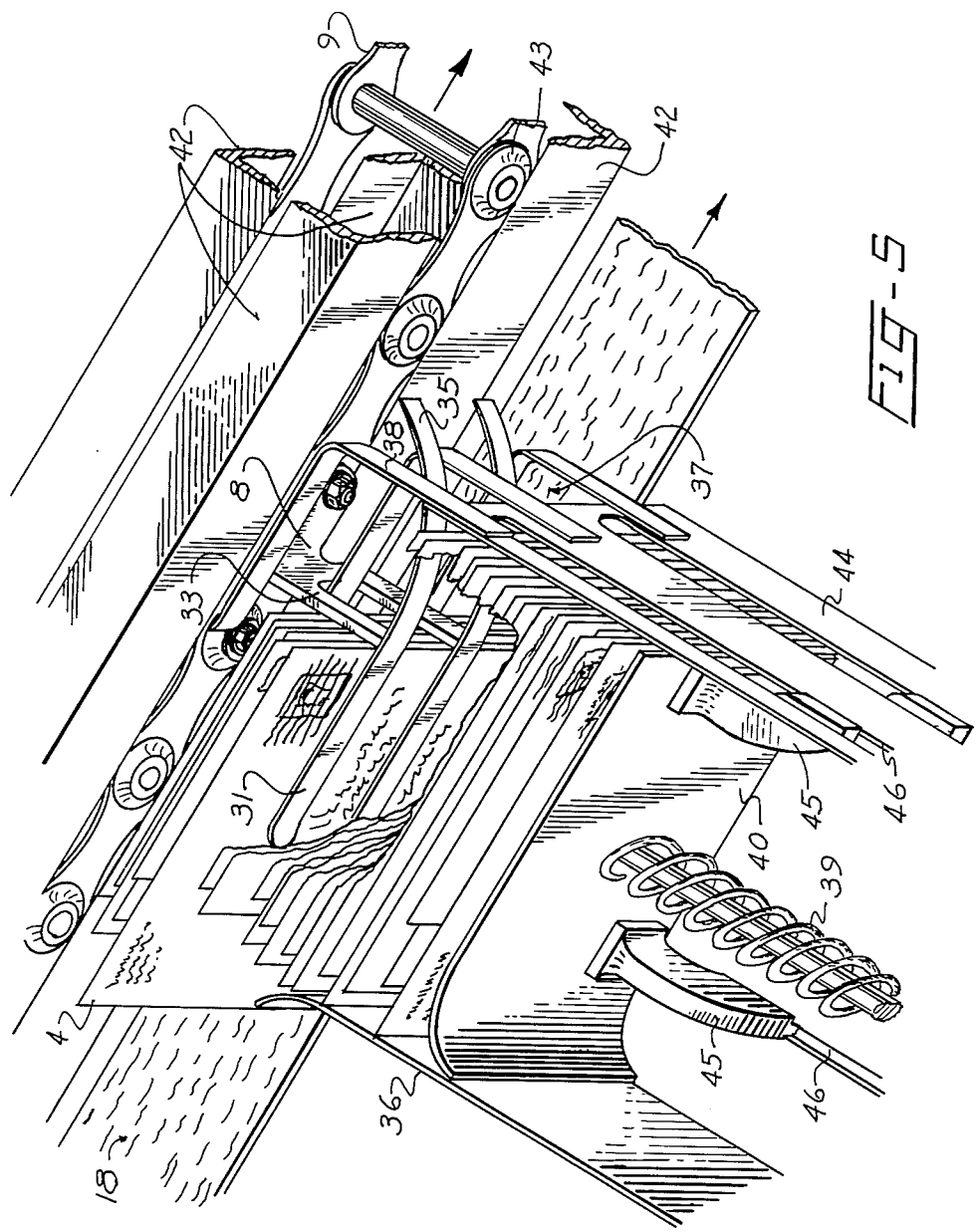

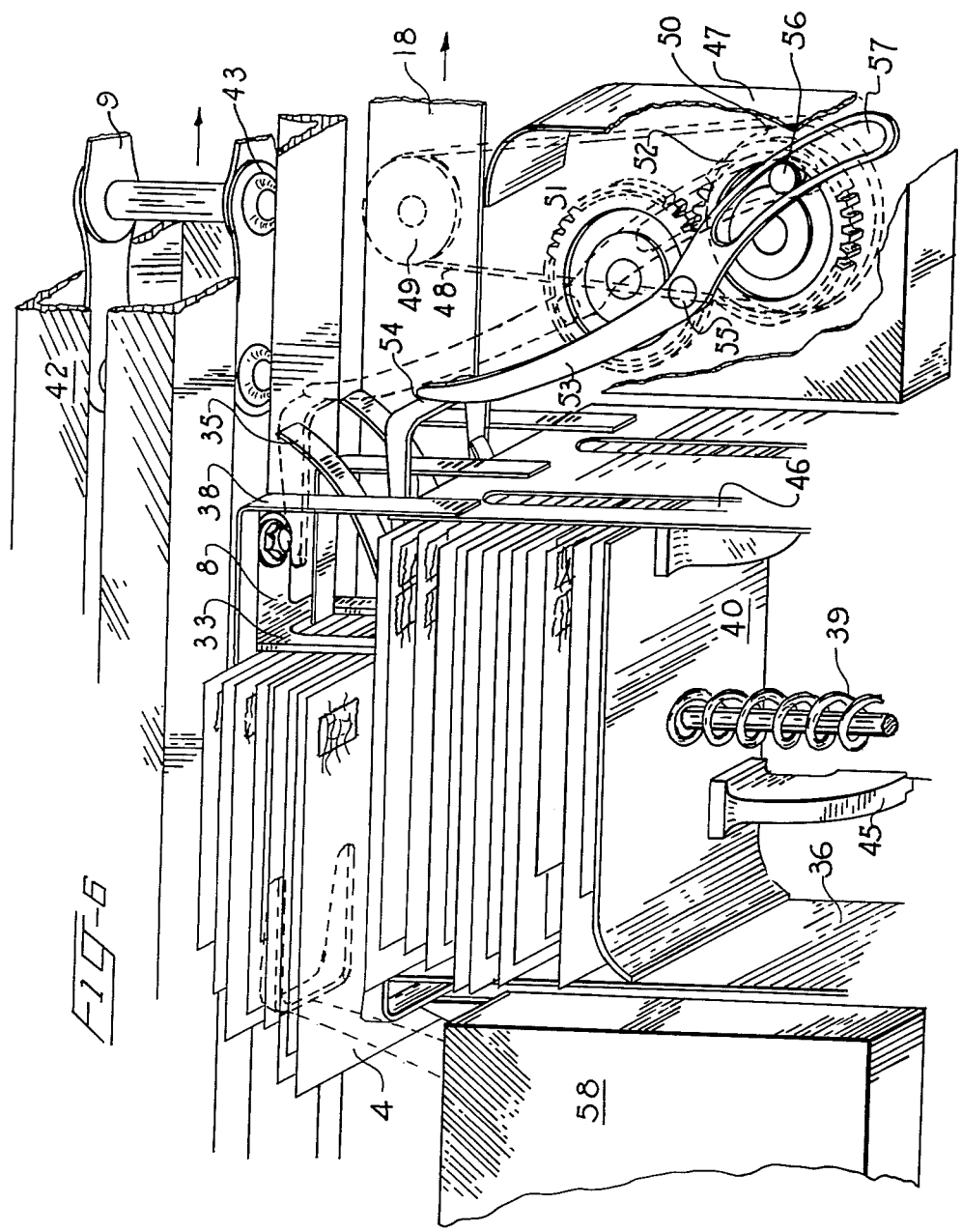

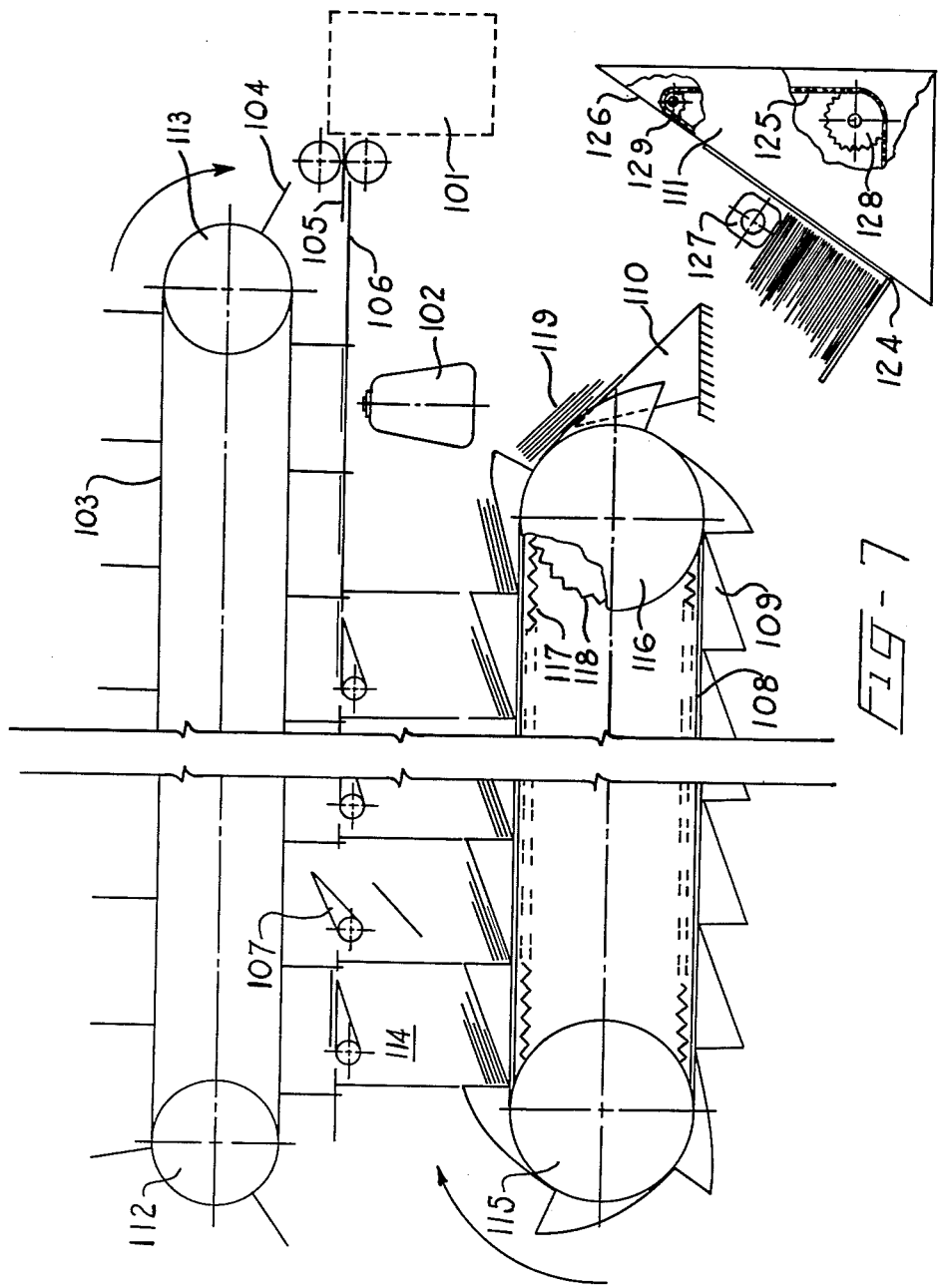

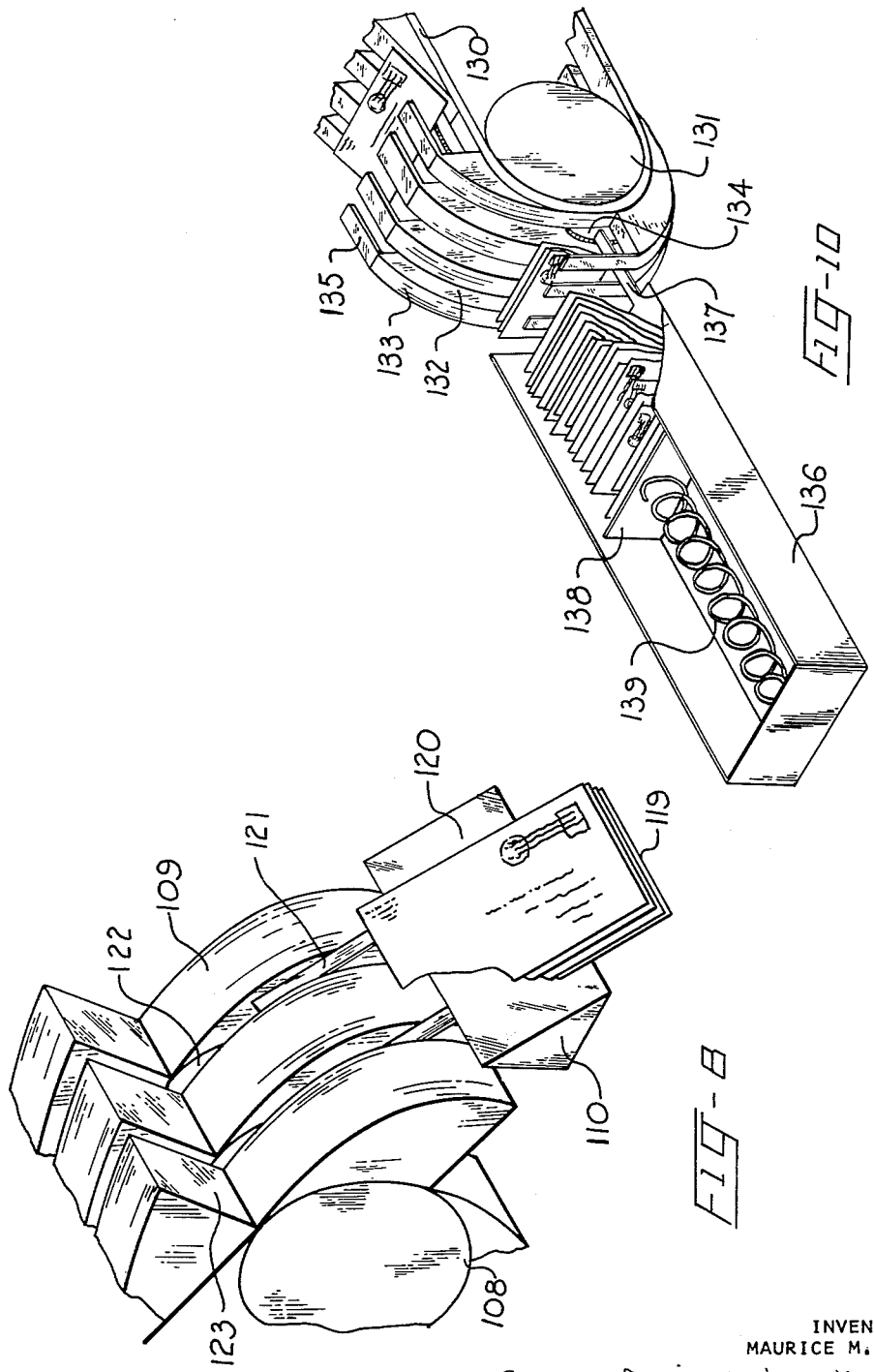

Aug. 10, 1965    M. M. LEVY    3,199,688
APPARATUS FOR SORTING FLAT ARTICLES
Original Filed Feb. 8, 1961    18 Sheets-Sheet 9
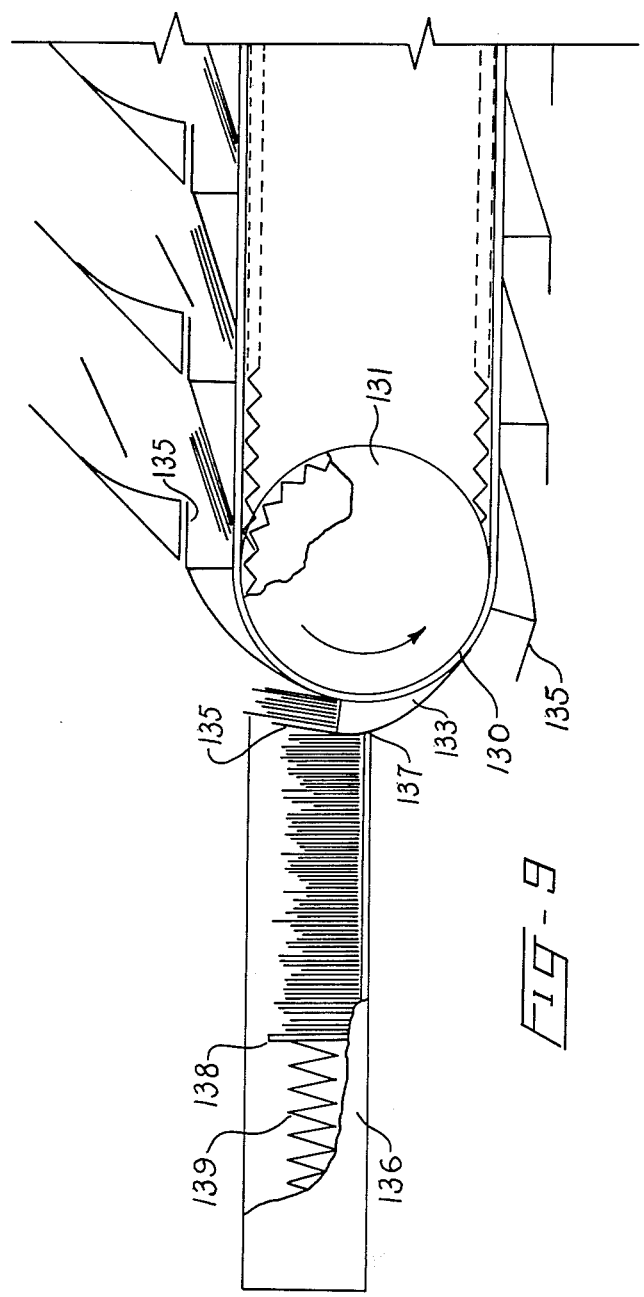
INVENTOR
MAURICE M. LEVY
BY Stevens, Davis, Miller + Mosher
ATTORNEYS Aug. 10, 1965   M. M. LEVY   3,199,688
APPARATUS FOR SORTING FLAT ARTICLES
Original Filed Feb. 8, 1961   18 Sheets-Sheet 10
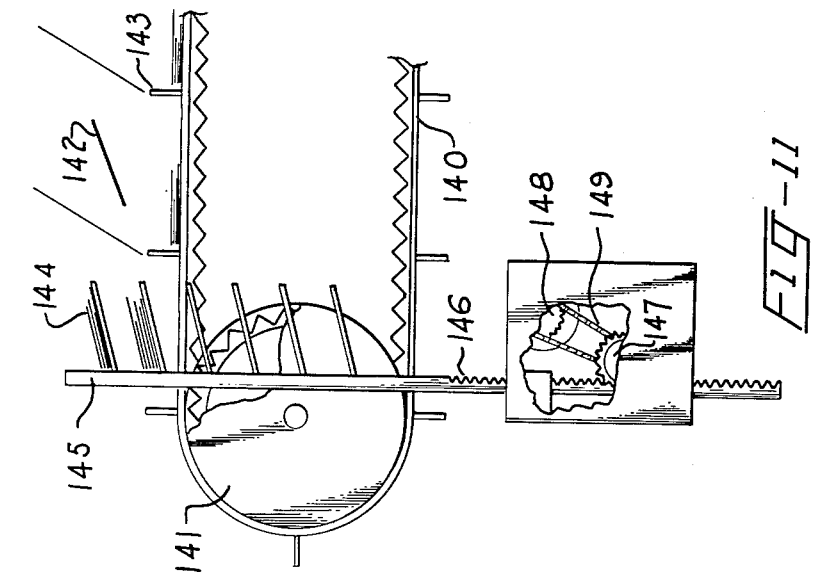
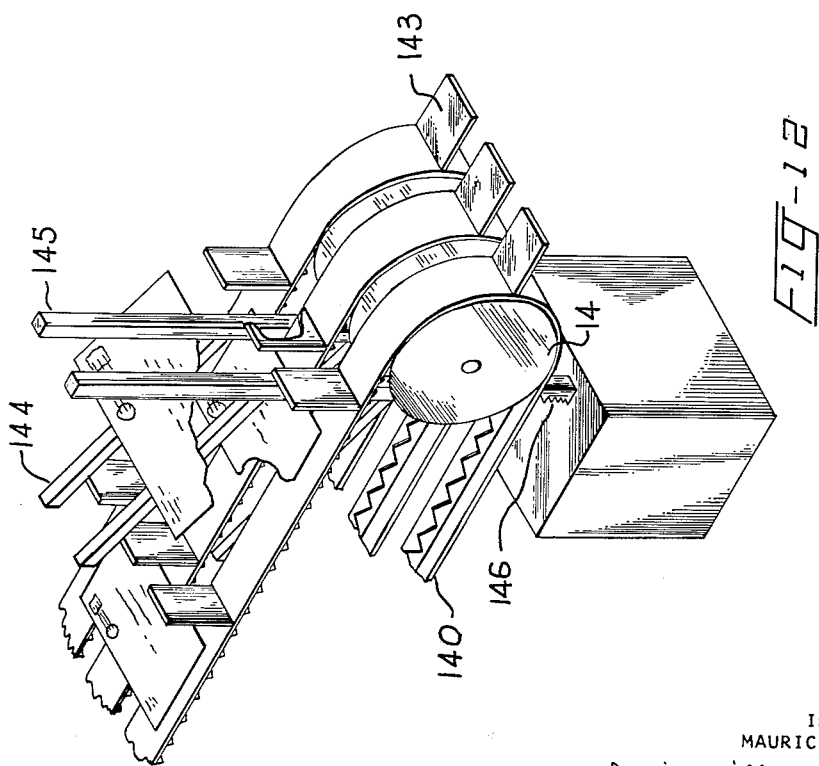
INVENTOR
MAURICE M. LEVY
BY Stevens, Davis, Miller + Mosher
ATTORNEYS

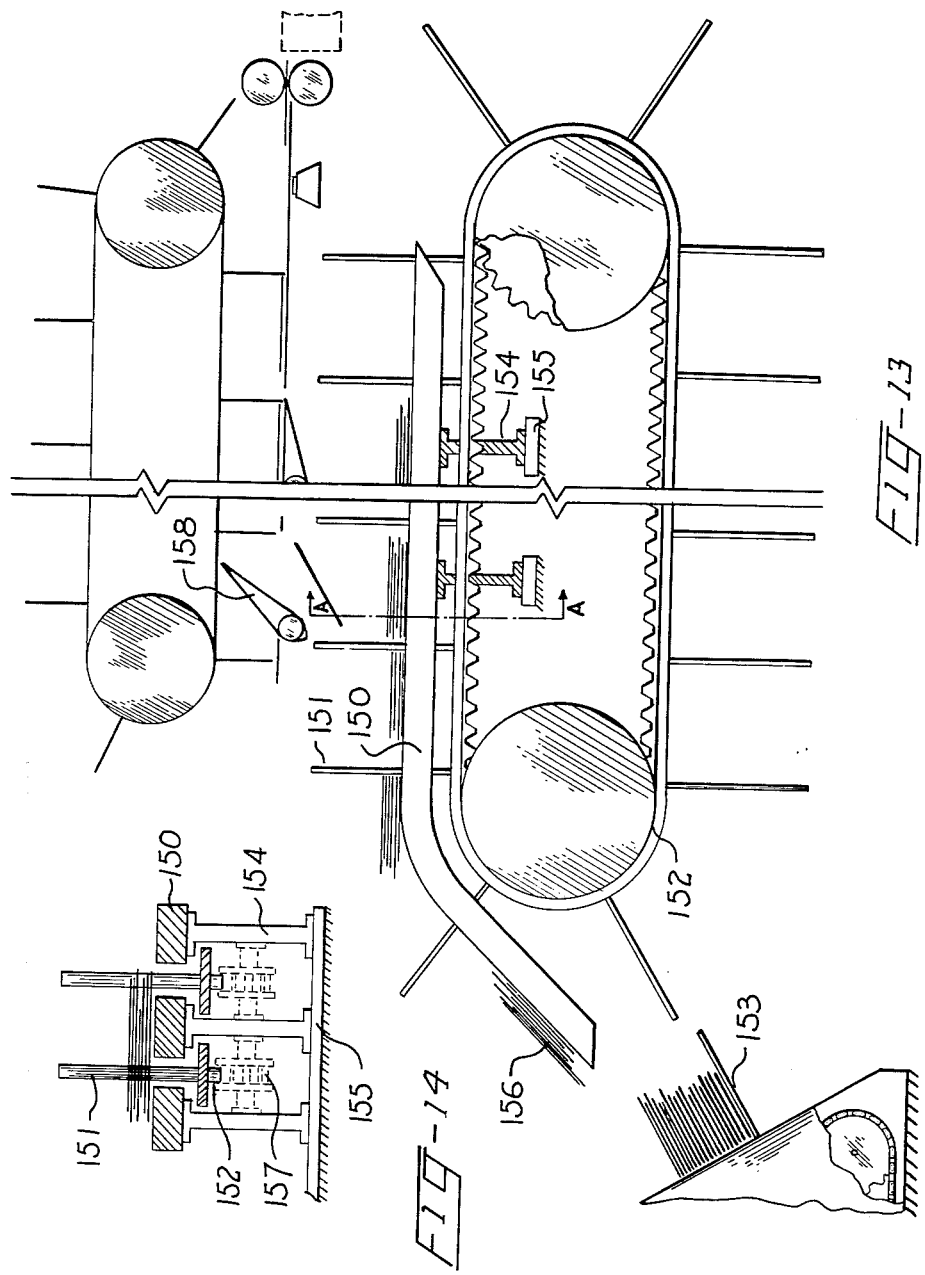

Aug. 10, 1965　　　　M. M. LEVY　　　　3,199,688
APPARATUS FOR SORTING FLAT ARTICLES
Original Filed Feb. 8, 1961　　　　　　　　　　18 Sheets-Sheet 12
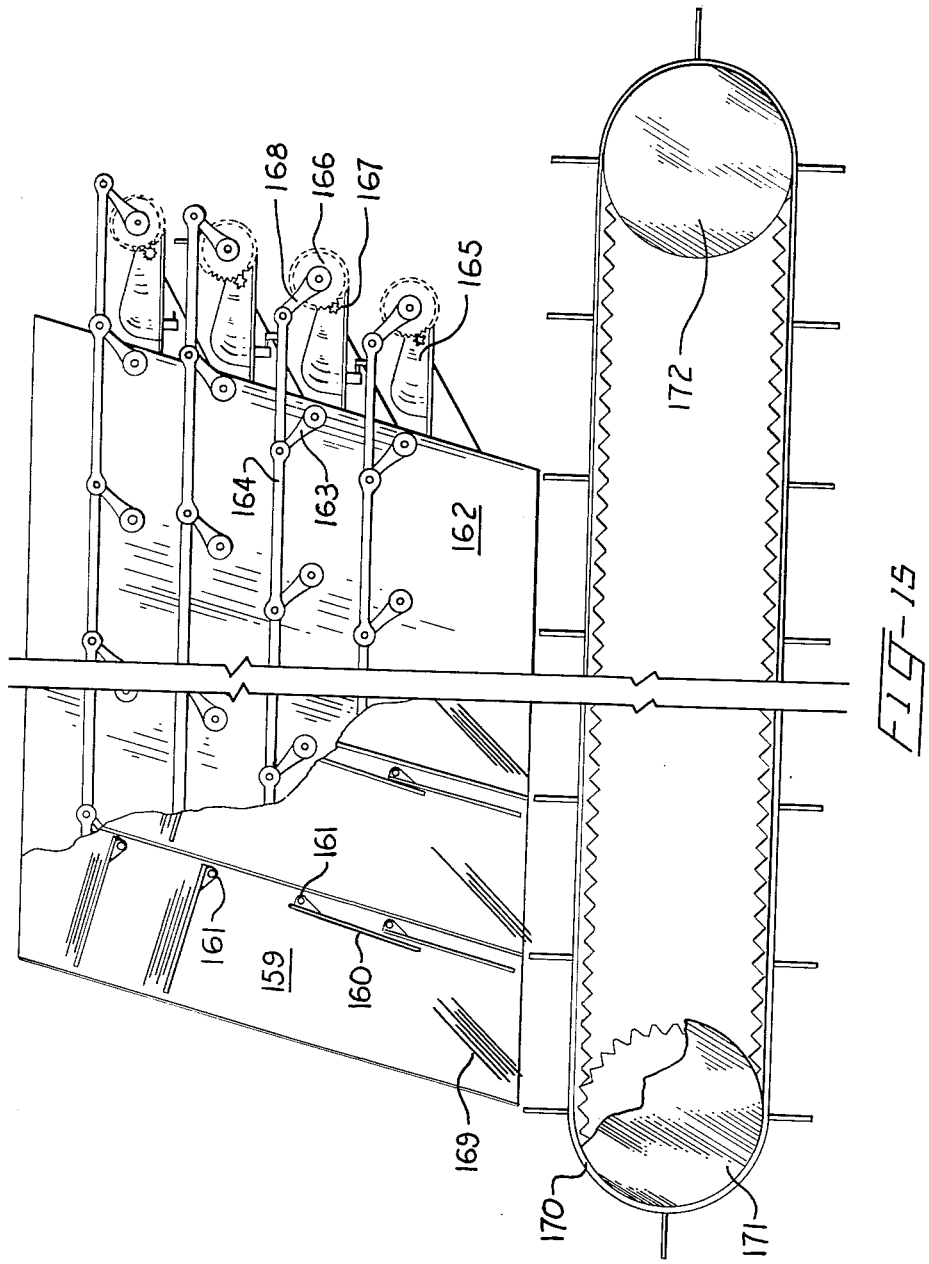
INVENTOR
MAURICE M. LEVY
BY Stevens, Davis, Miller + Mosher
ATTORNEYS

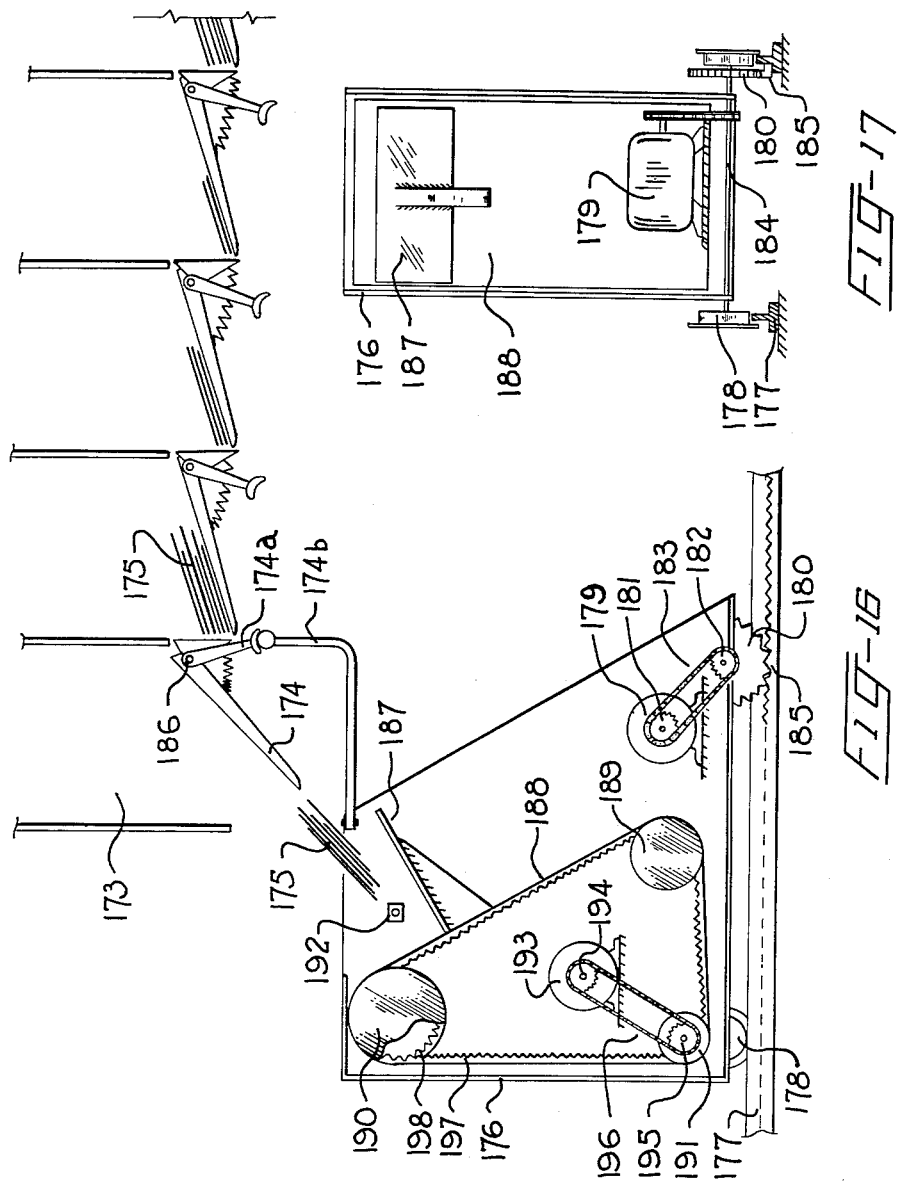

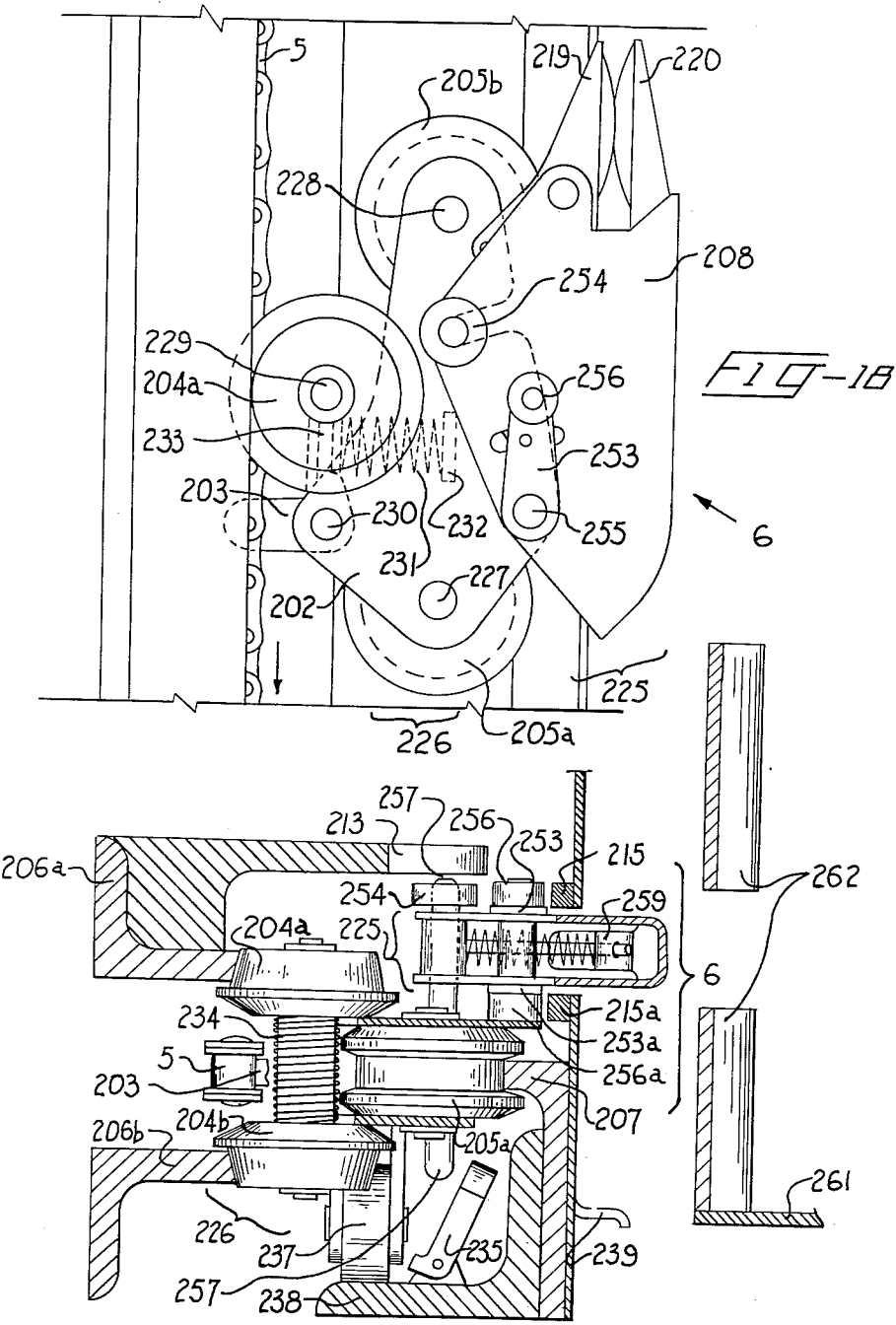

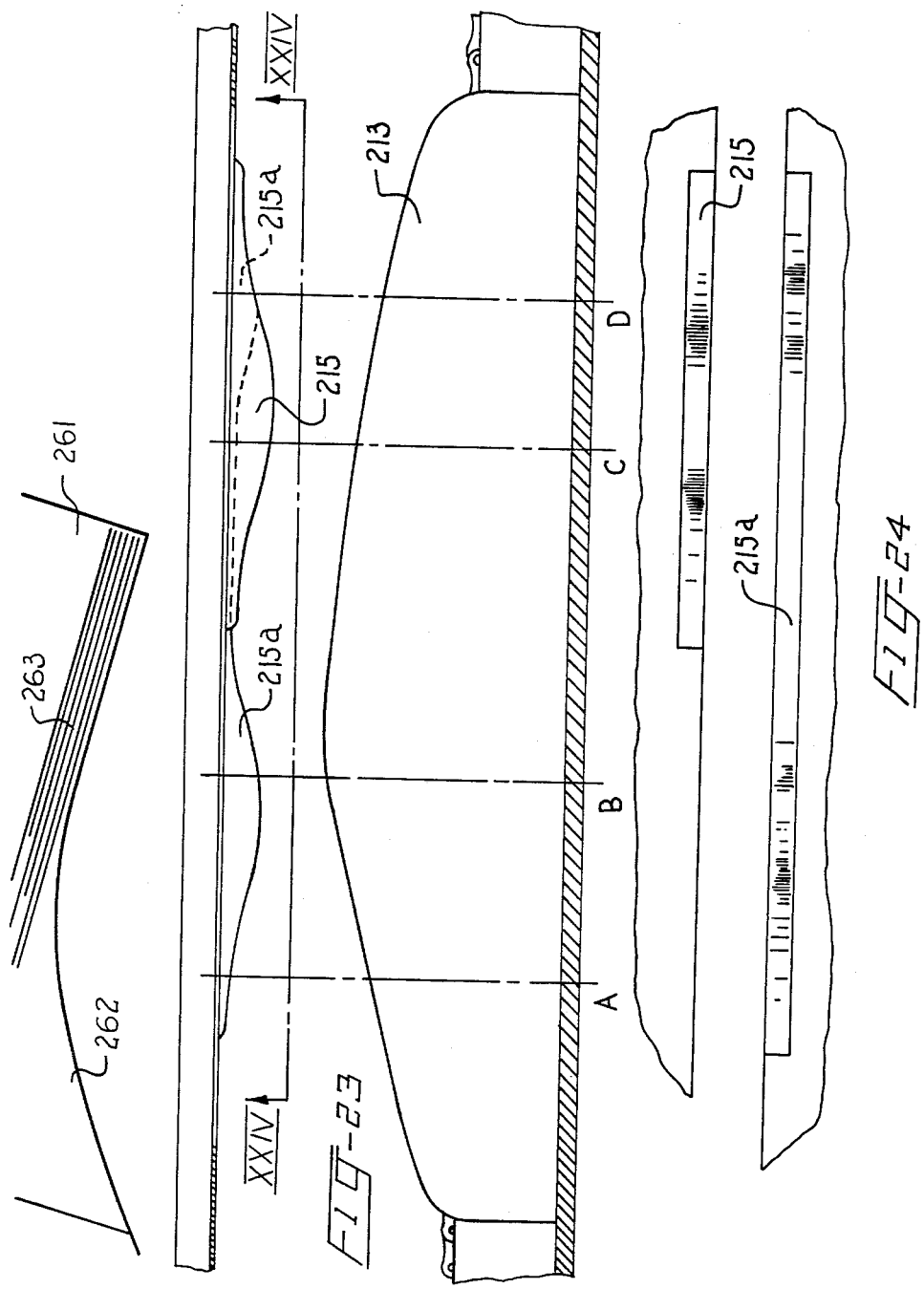

United States Patent Office 3,199,688
Patented Aug. 10, 1965

3,199,688
APPARATUS FOR SORTING FLAT ARTICLES
Maurice M. Levy, 208 Clemow Ave., Ottawa,
Ontario, Canada
Original application Feb. 8, 1961, Ser. No. 87,887.
Divided and this application June 26, 1964, Ser.
No. 383,268
5 Claims. (Cl. 214—7)

This application is a division of my copending application, Serial No. 87,887, filed February 8, 1961, and now abandoned.

This invention relates to improvements in apparatus and method for sorting and arranging in sequence letters, cards and other articles of generally flat rectangular shape.

Sorting systems have already been developed in which the addresses on pieces of letter mail or other data on record cards are first converted into binary or other code designations borne by the letters or cards. The letters or cards are then passed individually past an electronic reader which reads each set of code markings and determines from information stored in a file computer to which sortation outlet the letter or card in question should be conveyed. A compartment is provided at each outlet to receive the letters or cards diverted thereto and to form these letters or cards into a stack for subsequent handling. In the specific form of apparatus illustrated and described below a plurality of such outlets is provided, to any one of which the system may selectively convey each letter, card or like flat article (hereinafter referred to simply as "articles").

The object of the present invention is to provide improvements in the construction and operation of such apparatus, and particularly to provide apparatus that is more versatile in operation than any hitherto developed.

In particular it is an object of the invention to provide apparatus in which a series of sorting breakdowns can be performed on a single machine, the articles sorted on the first run through being automatically returned to the same sorting mechanism for a second run with a minimum of delay and a minimum of manual handling. To this end, the invention contemplates the provision of means for collecting the batches of letters deposited in the various accumulators after a first sort and transferring such batches in correct sequence to a stacker where they are formed into a stack for subsequent feeding back into the same machine, now to be sorted a second time in accordance with a different aspect of the code designations thereon.

The invention thus overcomes the disadvantages of earlier methods which have all involved immobilization of a sorter for substantial periods of time either while its accumulators are cleared by hand, or while the contents of its accumulators are individually transferred to a second sorter. When operating in accordance with the present invention, only a single sorter is needed (although any number of breakdowns can be performed) and delays in clearing such sorter are reduced so that a larger number of operating hours per day are obtained from the sorter.

Further advantages and uses for the invention will become apparent from the discussion and description of the following preferred embodiments.

Figure 20:
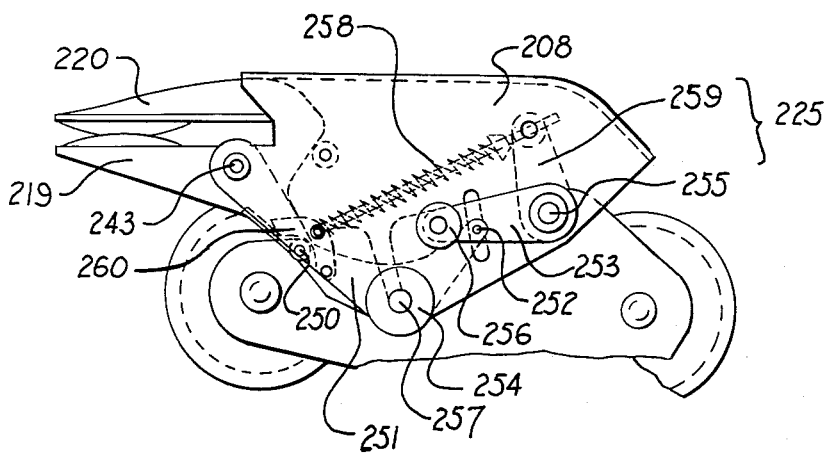
Figure 21B:
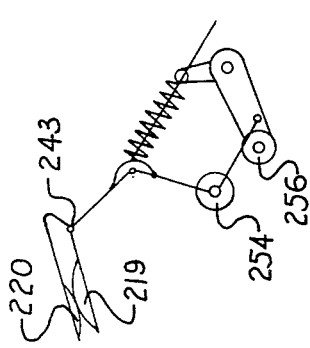
Figure 21D:
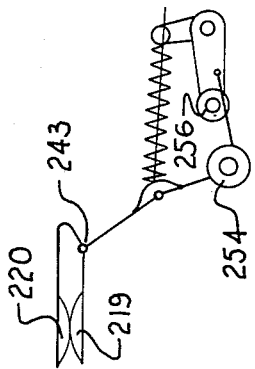
Figure 21A:
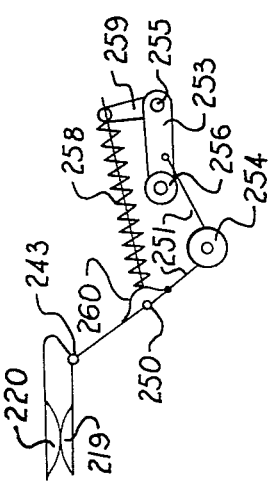
Figure 21C:
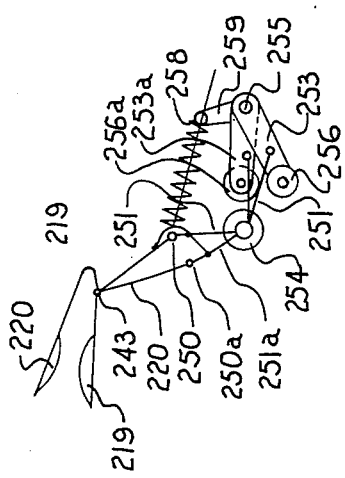
Figure 22:
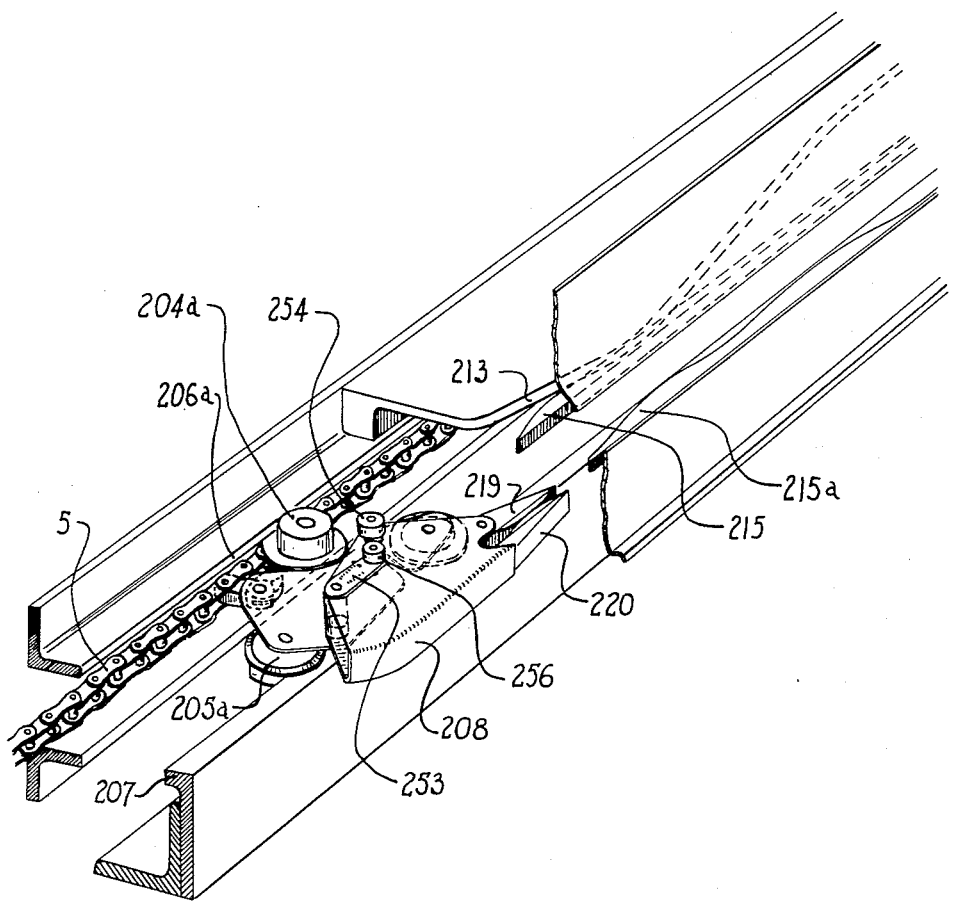

For purposes of illustration and ease of understanding the invention will be discussed with reference to the accompanying drawings in which:

FIGURE 1 is a map of a typical letter carrier's route.
FIGURE 2a is a plan view of one end of a sorter according to the invention.
FIGURE 2b is a plan view of the other end of such sorter, being a continuation of FIGURE 2a.
FIGURE 3a is an elevation view of FIGURE 2a.
FIGURE 3b is an elevation view of FIGURE 2b.
FIGURE 4 is an isometric view of a portion of the sorter of FIGURES 2 and 3, on an enlarged scale, showing a letter trap entering an accumulator to deposit a letter.
FIGURE 5 is an isometric view of a portion of the sorter of FIGURES 2 and 3, on an enlarged scale, showing an accumulator depositing a bundle of letters in a stacker.
FIGURE 6 is a view of generally the same parts as FIGURE 5, but including an indexing mechanism to push back the stacked mail.
FIGURE 7 is an alternative embodiment of sorter.
FIGURE 8 is an isometric view of the bundle removal mechanism of the sorter of FIGURE 7.
FIGURE 9 is a fragmentary view of a second alternative embodiment of sorter.
FIGURE 10 is an isometric view of the stacking mechanism of the sorter of FIGURE 9.
FIGURE 11 is a fragmentary view of a third alternative embodiment of sorter.
FIGURE 12 is an isometric view of the stacking mechanism of the sorter of FIGURE 11.
FIGURE 13 is a fourth alternative embodiment of sorter.
FIGURE 14 is a section view taken on line A—A of FIGURE 13.
FIGURE 15 is a multiple layer storage mechanism for use with the various embodiments of sorter illustrated.
FIGURE 16 is a fragmentary view of a fifth alternative embodiment of sorter, showing a moving stacker instead of moving accumulators and showing the stacker with the near side removed.
FIGURE 17 is an end view of the stacker of FIGURE 16.
FIGURE 18 is a plan view of a letter holder or "trap" for use with the apparatus of the earlier figures.
FIGURE 19 is an end view of the letter trap of FIGURE 18.
FIGURE 20 is a plan view of a portion of the letter trap of FIGURE 18.
FIGURE 21A is a diagram demonstrating the essential moving parts of this letter trap in a first position.
FIGURE 21B is a diagram similar to FIGURE 21A showing the parts in a second position.
FIGURE 21C is a further similar diagram showing the parts in a further position.
FIGURE 21D is yet a further similar diagram showing the parts in final position.
FIGURE 22 is a cut-away perspective view demonstrating the action of the letter trap of the preceding figures.
FIGURE 23 is a plan view of the cam structure.
FIGURE 24 is a view taken on the line XXIV—XXIV in FIG. 23.

The invention will be discussed first with regard to the preferred form shown in FIGURES 2a, 2b, 3a and 3b. The articles to be sorted in the example will be assumed to be letters, but it is to be understood that the device is suitable for use with other flat articles as above mentioned.

A letter feeder mechanism 3 (FIGURES 2b and 3b) feeds letters 4 which have each been marked with a binary code marking according to the address thereon. Such feeder 3 forms no part of the present invention and will not be further described in detail herein. Suffice to say that this feeder will be of a type adapted to feed individual letters with a predetermined periodicity between passage of successive leading edges of the letters past a given point. An example of a feeder of this type is described in copending United States patent application Serial No. 856,269, filed November 30, 1959, now Patent No. 2,995,302.

Feeder 3 delivers the letters 4 to an endless chain or conveyor belt 5 carrying a series of spaced letter-holders 6, referred to also as "letter-traps." The construction and detailed operation of these letter-holders or traps is described below in connection with FIGURES 18 to 24. At this stage in the description it is sufficient to state that each letter trap serves to receive an individual letter from the feeder 3 and to convey such letter to a selected stacker or "accumulator" to deposit such letter in the selected accumulator in the manner later described.

The belt 5 carries each letter trap 6 with its letter 4 past an electronic reader 7 which reads the code markings and determined from the information stored in a file computer (not shown) the outlet (accumulator 8) to which the letter is to go. The file computer will select the required accumulator to which each letter 4 scanned by the reader 7 is to be conveyed, and, at the correct time in the sequence of the letter traps 6 will actuate one of the movable setting cams for actuating the letter traps. These parts (reader and associated computer) form no part of the present inventive advance and consequently will not be further described in detail. For further information concerning the manner of such operation of such parts attention is directed to United States Patent No. 2,925,586, issued February 19, 1960, United States patent application No. 421,644, filed April 7, 1954 (Canadian Patent No. 539,092), and "Automation in Post Offices," volume XI, Proceedings of the National Electronics Conference, October 1955.

The belt 5 is carried on pulleys 10 and 11 (FIGURES 2a and 2b) and is driven by electric motor 12 through drive 13. Since two sides of the belt 5 are available, a second feeder 3a, reader 7a and row of accumulators 8a are provided to speed sorting and make use of space which would otherwise be wasted. This second set of equipment which will not be separately described has been shown in FIGURES 2a, 2b, 3a and 3b, with the parts numbered the same as the first set except for the addition of the suffix "a" to each numeral.

The accumulators 8 which receive the letters from the letter traps 6 are best shown in FIGURE 4. The manner in which the letter traps 6 are activated to deposit the letters is described below. It will be sufficient here to state that a signal from the computer causes activation of a solenoid to place a cam in the path of the letter trap 6 to cause it to project laterally from its carrying belt 5 on its arm 41 and so pass between fingers 31 of the accumulator 8. Another cam opens the jaws of the trap 6 to permit the letter 4 to remain in the accumulator 8.

The accumulator consists of a forked stem 29 bolted or otherwise fastened at 30 to an endless chain 9, two fingers 31 secured at 32 to the arms 33 of forked stem 29, and two spring steel backing members 34 each secured at one end to the stem 29 and each bearing with its free end against an inside surface of a finger 31. As the letter trap 6 enters the accumulator 8 to pass between the fingers 31, the letter 4 pushes back the spring members 34 and comes to bear against the arms 33. As the trap 6 leaves the accumulator 8, the spring members 34 press the letter 4 against the back of the fingers 31 to hold it in upright position. As additional letters are deposited the previously deposited letters are pushed back by the resilient face plate 6b which each letter trap possesses, the totality of stacked letters being always held by the spring members 34 to produce orderly stacking. The fingers 31 have integral curved extensions 35 projecting beyond arms 33 for a purpose which will be explained later.

The accumulators 8 are carried at spaced intervals on an endless chain conveyor 9 which in turn is mounted on sprockets 14 and 15 (FIGURES 3a and 3b). Drive for the chain 9 is obtained from an electric motor and reduction gear unit 16 through chain 17 on sprockets 26 and 27. The upper span of the chain 9 is supported by four angle iron guide rails 42 arranged to form corners of a track as best shown in FIGURES 4 and 5. The lower span of the chain is supported on skid 42'. The crossmembers 91 of the chain 9 have mounted on each end a flanged wheel 43 which rides on the rails 42. The upper and lower rails 42 are spaced at a distance slightly greater than the diameter of the wheels 43, so that the wheels rest on the lower rails and turn freely, but will be restrained from leaving the track or tipping out of a horizontal plane by the upper rails when loads are applied to the accumulators 8. Alternatively, the crossmembers 91 of the chain 9 can slide directly on a longitudinally extending bar which may conveniently be constructed of nylon. The width of such a bar would be only slightly less than the inside spacing between the links of the chain 9 to guide the chain. As found necessary a continuous or a series of discontinuous similar bars may be spaced above the crossmembers 9' to limit upward movement of such crossmembers.

In order to maintain the letters more securely in position in the accumulators 8 a smooth endless belt 18 is mounted with its upper span a spaced distance below the accumulators and parallel to the chain 9. The lower edges 21 of the letters rest on the upper surface 22 (FIGURE 4) of the belt 18 and are supported thereby. The belt 18 is mounted on pulleys 19 and 20, pulley 19 being driven from sprocket 24 through chain 23 and sprocket 28, and sprocket 24 being mounted on the same shaft 25 as sprocket 27 to rotate therewith. Belt 18 may be stationary while the accumulators 8 are being filled, or it may be moved slowly or fast in the same direction as the traps 6 so that friction between the letters and the belt 18 keeps the letters firmly in place against the arms 33. If it is desired that the belt 18 should move while the accumulators 8 are being filled, a clutch or ratchet system (not shown) will be provided on shaft 25 such that sprocket 24 can be turned without turning shaft 25, a separate drive (not shown) for pulley 19 being provided. The essential requirement is that, when chain 9 is put in motion, the belt 18 is also placed in motion at the same or slightly greater linear speed to keep the letters properly urged forward in the accumulators 8.

Belt 18 is convenient, but not essential. Each accumulator could have a flat bottom to support the letters.

If desired, to guard against overcrowding of the accumulators, they may each be fitted with a safety switch (not shown) positioned to be closed by a spring member 34 when a predetermined thickness of letters has been received and such spring member has been forced back as far as the design permits. Such switches which would be of known type could be mounted on the framework of the machine or on the accumulators themselves. Closing a switch would signal the computer to send any additional letters to a second accumulator or to a reject bin for later sorting.

The sorting operation described up to this point is a preliminary sorting stage and is essentially the same in fundamentals as the methods described in the various prior applications above referred to. This preliminary stage is the same for all types of articles. The exact nature of the succeeding stages depends, however, upon what is being sorted and the method chosen. As a first example, sorting of mail for a letter carrier's walk will be explained.

FIGURE 1 is a map of a typical mail carrier's walk designated by the numeral 1. The walk which starts at S and finishes at F is formed of several portions, defined between breakpoints 2 which occur whenever a change is made from one street to another or from one side of a street to the other. One way of facilitating handling of the mail is to arrange it for the carrier in groups, each of which groups corresponds to a portion of the walk between two successive breaks. The groups should be arranged in sequence according to the sequence of the corresponding portions of the walk, and the letters in each group should be arranged in sequence according to the delivery order in that portion.

There are two methods by which sorting for a walk to provide this sequencing may be accomplished. The first to be discussed will be the information card method.

Let it be assumed that the sorter of FIGURES 2 and 3 has already been employed to sort the mail into walks, and is now to be used to take the mail for each walk and arrange it in sequence. The mail for the first walk is taken and is first sorted into groups, each of which is destined for a single portion of the walk. To use the sorter for this purpose merely requires suitable setting of the file computer. Information cards, one for each group, are then fed into the sorter. These information cards are so coded as to be deposited on top of the letters, one in each of the accumulators 8, and, in addition to being coded in the same manner as the letters, each card is adapted for operation of the machine in the subsequent sorting operations. When the information cards are in place in their respective accumulators 8, motor 16 is energised so that the chain 9 and the belt 13 are driven to move the accumulators successively past a stacker 36 which is located at the opposite end of the chain 9 from the feeder 3.

The operation of the stacker 36 will now be described with particular reference to FIGURE 5.

As each accumulator 8 passes the stacker 36, its fingers 31 pass through spaces 37 between L-shaped fingers 38 forming part of the stacker. One portion of each of the fingers 38 is secured to a stacker tray 44 and extends across the path of travel of the batch of letters in the accumulator so that such batch is withdrawn from the accumulator as it moves on. Inside the stacker tray 44 a gate 40 is held by spring 39 against the letters, so that, after each accumulator has left the stacker, the letters collected are pressed against the free ends of the fingers 38 which extend almost parallel to the letters. As each succeeding accumulator enters the stacker the curved finger extensions 35 of the fingers 31 push back and already stacked letters against the action of spring 39 to make room for the next bundle and ensure that each bundle is placed in proper sequence in the stack. The gate 40 is mounted on guide arms 45 which slide in grooves 46 in the sides and bottom of the tray 44 to hold the gate in a plane normal to the major axis of the tray, that is parallel with the planes of the letters.

FIGURE 6 shows an alternative construction of stacker. If the number of letters in the stacker tray become large, an excessive strain may be placed on the accumulators 8 and the chain 9 with each batch deposited due to the force needed to displace the letters already stacked. FIGURE 6 shows an indexing mechanism 47 which acts to retract the already stacked letters prior to each accumulator entering the stacker. This mechanism is composed of two counter-rotating, meshing gears 51 and 52, and an indexing arm 53. One end of the arm 53 carries a forked claw 54 disposed to engage the stacked letters and push them back into the stacker tray. The arm 53 is centrally pivotally mounted at 55 on a point near the periphery of gear 51 which thus imparts a reciprocating motion to the arm 53 to move the forked claw 54 in a direction parallel to the major axis of the stacker tray. A cam follower 56 is mounted on gear 52 near its periphery and moves in a cam slot 57 in the other end of the arm, rotation of gear 52 causing motion of the forked claw 54 in a direction parallel to the minor axis of the stacker tray. Thus, the claw 54 first enters the spaces between the fingers 38; it then moves back with the rotation of gear 51 and outwardly with continued rotation of gear 52, finally moving forward toward the chain 9 with continued rotation of gear 51. This forward position is shown in broken lines in FIGURE 6. If necessary for long cards or letters, a second similar indexing unit 58 can be positioned on the other side of the stacker tray. Indexing mechanism 47 is driven by a chain 48 through sprockets 49 and 50, sprocket 49 being driven through a linkage (not shown) from the chain 9 so that the indexing mechanism is properly timed with relation to the movement of the accumulators 8.

When all of the accumulators 8 have passed by the stacker 36 the thus assembled groups of mail are removed from the stacker and in this form the mail is once again placed in the feeder 3. The chain 9 continues until it has returned to its original position with a series of empty accumulators awaiting the next operation. The feeder 3 is then actuated to feed the letters once more.

On this run of the letters through the sorter, the file computer is set to place each letter of each group in a respective accumulator according to the position of the destination of the letter along the portion of the walk corresponding to such group. As each group finishes its run past the reader 7 the information card comes to the head of the stack and operates a feeler 200 which stops the feeder 3 and starts the chain 9. One form that the feeler 200 may take is a pair of wiping contacts spaced apart from each other. A conducting band on the information card will be positioned to bridge these contacts and energise the feeler 200. The single group is thus collected in the stacker in sequence of accumulators which will be the sequence of deliveries for that portion of the walk. The feeder 3 is then restarted. When all of the groups have been run through in this way, the mail for the walk will lie in the stacker in correct order for the whole walk, so that the mail carrier has only to remove the top letters from the pile as he comes to each delivery.

If the number of portions of a walk exceeds the number of accumulators on the chain 9, the walk may first be broken up into sections then the sections into groups and finally the groups sequenced in the manner just described. There is no limit to the number of breakdowns that the sorter can perform.

Normally, as above explained, at the final stage the mail in only one group is handled at any one time, but, should a certain group contain only a few deliveries, two groups may be placed in the feeder simultaneously and the computer programme and the information cards arranged to sort both groups at the same time. In this way all or nearly all the accumulators can be utilized each time the sorter is used.

In a second method of sorting and sequencing mail for a carrier's walk no information cards are used. Instead, the sorting criteria at the various stages of sorting can be reversed in that the first stage sorts in respect of the last series of breakdown criteria, the second stage sorts in respect of the second last series of breakdown criteria and so on. This procedure will now be more fully explained.

In practice, the last series of breakdown criteria will usually consist of the numbers of the houses in the streets of the walk, and the second last series of breakdown criteria will consist of the street names themselves. Alternatively, in a large building, the last series of breakdown criteria could be the numbers of rooms while the second last series would be the floor numbers of the building, the building then constituting a whole walk or at least a plurality of portions of a walk. These criteria will form part of the coded information on each piece of mail and will usually be in binary form, as above described. For the purposes of simplifying the following explanation, decimal numerals will be employed, but it will be understood that the principal of the method is equally appropriate to the binary or any other coding system.

For the sake of explanation let it be assumed that the walk consists of 100 stops (different destination for mail) divided into 10 portions each of 10 stops. The 100 stops can then be represented graphically by the numerals 00 to 99. Numerals 00 to 09 will be the stops of the first portion; 10 to 19 of the second; 20 to 29 of the third, and so on.

In the method previously described (using information cards) the mail is sorted during the first time through the sorter by the first digit, all those pieces of mail bearing 0 as the first digit going to the first accumulator, those with 1 as the first digit going to the second accumulator, and so on. In this way the mail is sorted into groups, which are sequenced, and then resorted by using the second digit as the breakdown criteria, the first accumulator receiving any mail coded 00; the second accumulator, mail coded 01; the third accumulator, mail coded 02, and so on.

When the first information card is reached after all the first group has been sorted in this way, the machine is stopped to allow the accumulators to be emptied before the second group of mail is sorted, 10, 11, 12 and so on into respective accumulators. This method may be considered as a "horizontal" method of staged sorting, as reference to Table 1 which follows will demonstrate.

*Table 1*

| 00 | 01 | 02 | 03 | 04 | 05 | 06 | 07 | 08 | 09 |
|----|----|----|----|----|----|----|----|----|----|
| 10 | 11 | 12 | 13 | 14 | 15 | 16 | 17 | 18 | 19 |
| 20 | 21 | 22 | 23 | 24 | 25 | 26 | 27 | 28 | 29 |
| .  | .  | .  | .  | .  | .  | .  | .  | .  | .  |
| 90 | 91 | 92 | 93 | 94 | 95 | 96 | 97 | 98 | 99 |

Each horizontal line represents a group and the first sort divides into groups.

In accordance with the second method, however, which can be looked upon as a "vertical" method, the first sort divides the 100 stops by the vertical lines. The file computer is set to make the first sort in accordance with the last code digit. The first accumulator will thus receive all mail coded 00, 10, 20, 30, 40, 50, 60, 70, 80 or 90; the second accumulator will receive mail coded 01, 11, 21, 31, 41, 51, 61, 71, 81 or 91; and so on. The results of this first sort are then sequenced, and fed again through the machine, the file computer now being set to sort by the second last digit (in this case, the first digit; but the method is universally effective—that is for a three or more digit code—so it is more generally appropriate to talk of the second sort using the second last digit as breakdown criterion, the third sort using the third last digit and so on). The effect of the sequencing is to take first the batch of mail collected in the first accumulator during the first sort, and resort it in accordance with its first digit. The first accumulator, that is the one nearest the stacker, will then receive (during this first period of the second sort) only mail coded 00, the second accumulator will receive mail coded 10 and so on. As soon as the machine has sorted all the mail from the first accumulator of the first sort, it will pass immediately to the mail which was collected in the second accumulator during the first sort, since no informaton cards are used in this method to stop the machine. This second batch will consist of mail coded 01, 11, 21, etc., and the second sort will divide it in this order among the accumulators, 01 to the first, 11 to the second and so on.

The first accumulator will already have received mail 00; it will now receive mail coded 01. When the third batch is sorted, it will receive mail coded 02. In this way, the first accumulator will receive in correct order mail coded 00, 01, 02 . . . 09. At the same time the second accumulator will have been receiving mail 10, 11, 12 . . . 19; the third accumulator, 20, 21, 22 . . . 29; and so on, always in this correct order. Now, when the results of this final sort are sequenced, the entire body of mail is collected in correct order from 00 to 99.

As already mentioned, the method will produce the same final result however many digits there are in the code designations. It is merely necessary to sort as many times as there are digits, and work from the last digit towards the first as the breakdown criterion in each subsequent sort. Proper sequencing between sorts, is, of course, an essential part of the process.

As a result of this versatility, the method is well suited to the placing of punch cards in numerical order. When using a decimal system, only ten accumulators are needed, however many cards there are.

When a binary system is used, it is convenient to provide a power of 2, such as 16 or 32, accumulators.

FIGURES 7 to 16 inclusive show various structural embodiments of the invention whereby a stack of unsorted letter mail may be sorted and sequenced until complete sorting results.

Again, the nature of the letter feeder and the sorting mechanism forms no part of the present invention. The structure whereby sequencing can be achieved is not limited in its application to the type of sorting mechanism shown in the drawings, but may be used with any sorter delivering to a series of accumulators or other compartments. By way of example the sorters shown in FIGURES 7 to 14 of the drawings are similar to those shown in United States Patent 1,656,999 to Bull, 1,916,801 to Knutsen, or in United States pending application No. 56,925, filed September 19, 1960, now Patent 3,129,824.

The embodiment shown in FIGURE 7 is formed of the feeder 101, electronic reader 102, sorter belt 103 with attached arms 104 for propelling letters 105 along a slide 106 in which deflection flaps 107 are located at intervals, sequencing belt conveyor 108 with wedges 109, batch remove 110, and stacker 111. Letters 105 with appropriate destination codes impressed on them are moved along the slide 106 by arms 104 of the belt 103 which is mounted on pulleys 112 and 113. As the letters move past the reader 102 a signal is sent to the file computer (not shown) and at the appropiate time a deflection flap 107 selected by such computer rises to deflect the letter into the proper compartment 114 according to destination. The bottoms of the compartments 114 which constitute the accumulators are formed by the wedges 109 which are secured to the sequencing belt 108, the latter being mounted on pulleys 115 and 116 and maintained in proper orientation by teeth 117 mating with teeth 118 on the pulleys 115 and 116. The teeth 117 are preferably formed on a ridge on the inside centre of the belt 108 and teeth 118 are arranged in grooves in the pulleys.

When all of the letters (and the colored information cards if this system is used) in the feeder 101 have been delivered to the appropriate compartments 114, the belt 108 is moved in the direction indicated by the arrow at the left of the belt and the batches of letters 119 are withdrawn from the belt 108 by the batch remover 110, the structure of which is best seen from FIGURE 8. It consists of a sloped face 120 and two fingers 121 forming extensions of the face 120 and each projecting into a slot 122 cut in each of the wedges 109. The fingers 121 are sufficiently long to ensure that their ends do not project above the surface of a wedge 109 until the distance between the ends of the fingers and the end wall 123 of the next wedge 109 is less than the minimum letter length. This ensures smooth removal of all letters.

Batches of letters removed in this way fall into a stacker tray 124 which is mounted on a chain 125 so that it may be moved on a sloped surface 126. As each batch falls onto the tray 124 a photocell 127 causes energization of a motor (not shown) which moves chain 125 on sprockets 128 and 129 to lower the tray 124 to make room for the next batch. A photocell control is preferred over a regular movement, since the batches may vary in thickness. If desired, the stacker may comprise separate compartments (as illustrated below in FIGURE 11), the tray movement being controlled by connection to the belt drive. The angle between the surface 120 and the bottom of the tray 124 is preferably such that the leading edge of each falling batch is deflected upwardly on striking the already stacked mail and the batch settles in place with less chance of letters flipping over.

When all of the batches have been delivered to the stacker tray the entire stack of letters is again placed in the feeder and run through the sorter. When no information card is used the sorting is continuous and takes place as explained previously for sorting with binary or decimal codes. When information cards are used, the feeder 101 and sequencing belt 103 are stopped and started according to the instructions on the card. Thus, in either case, each batch is placed in the stacker tray completely sequenced, or the stack may be further sequenced as desired.

It may be stated here that the information cards, if used, may be fed before or after the unsorted articles depending on which way the stacked articles are to be returned to the feeder. The requirement is that the stacked batches must be placed in the feeder with an information card preceding each batch at the time of feed.

FIGURES 9 and 10 show a further alternative embodiment, the feeder and sorter mechanism, which may be the same as in FIGURE 7, being omitted. The belt 130 and pulley system 131 is the same as in FIGURE 7, except that grooves 132 in wedges 133 extend into grooves 134 in the surface of the belt 130. In addition, the wedges 133 have integral extensions 135 projecting rearwardly from their upper edges.

When the batches are ready for stacking the sequencing belt 130 moves so that, as the wedges pass around the pulley 131, each batch falls forward behind an extension 135. The stacker tray 136 is placed at the end of the sequencing belt 130 with its bottom parallel to the main spans of the belt, fingers 137 forming extensions of the tray bottom that project into grooves 132 and into the path of travel of the letters so that when the batch strikes the fingers 137 it is withdrawn from the belt, the inclined surface of the next wedge pushing the batch back in the tray 136 to make space for the next batch. The extensions 135 ensure that the already stacked mail is held back long enough to allow the entering batch to be properly placed. A gate 138 is held against the stacking mail by spring member 139. The surfaces of the wedges 133 are preferably of polished metal or are coated with a smooth low friction material, or are waxed, to present a surface with a low drag on the letters to minimise the chance of crumpling of thin flexible letters when the stacked mail is moved back in the trays. Sorting and sequencing is accomplished as previously described.

In the embodiment shown in FIGURES 11 and 12 there are three separate belts 140 arranged side by side and corresponding pulleys 141, although the three pulleys are mounted on a single shaft so that the belts move together. Letters 142 are sorted onto the belt 140 between projections 143 which thus define the accumulators. In this case the stacker is formed of pairs of arms 144 mounted at a slight upward incline on upright bars 145 which stand between the belts 140. Bars 145 have rack teeth 146 on their lower ends, these teeth engaging pinions 147 driven by chain 149 from sprocket 148 which is connected to a suitable drive mechanism. After each batch has been deposited on a pair of arms 144, the upright bars 145 are moved up one space to receive the next batch. When all of the batches have been collected in this way they are removed from the stacker for delivery, or to be run through again for further sorting and sequencing.

The embodiment shown in FIGURES 13 and 14 differs from the previous embodiments in that the letters are received on a fixed slide 150, while fingers 151 projecting up from belt 152 define the accumulators with the slide 150. Fingers 151 slide the batches along to a stacker tray 153, the stacker tray being mounted and operating in the same way as shown in FIGURE 7. The fixed slide 150 is made up of three parallel segments as best seen in FIGURE 14, and each segment is supported at intervals on pillars 154 which are in turn supported by a frame member 155. Fingers 151 move between the segments to deliver the batches 156 to the stacker tray 153, these fingers also forming the walls of the sorting compartments when the belt 152 is stationary. The supporting pillars 154 also serve to mount pulleys 157 (shown in dotted lines in FIGURE 14 and omitted from FIGURE 13) which carry the belt 152 and keep the fingers 151 at the correct level in relation to the letter deflection flaps 158.

If desired the fingers 151 may be placed on only one half of the belt 152 so that the belt may be stopped in a position such that the slide 150 is entirely clear of fingers. This is necessary if it is required to sort the mail into movable storage trays placed in position between the slide and the sorter mechanism. This feature, which enables the sorter to operate either with or without sequencing, is also feasible for the previously discussed embodiments.

A possible modification of the embodiment shown in FIGURE 14 is to mount the fingers to depend from parallel chains above the slide 150, the letters dropping onto the slide between the parallel chains during the sorting operation. In this embodiment the slide would have to turn to the side to deliver the batches, or the chain would have to encircle the stacker equipment as well as the slide.

The device of FIGURE 15 is a storage mechanism which may be used with any embodiment using the letter deflector or gravity type sorter in which letters drop into sorting bins. The bins 159 are much deeper than, for example, the compartments 114 of FIGURE 7, and contain hinged flaps 160 which divide the bins into a number of compartments. The flaps 160 are rigidly secured to shafts 161 which extend through the side walls 162, one end of each shaft 161 having a crank arm 163 rigidly secured thereto. The free end of each crank arm 163 is connected by means of a rod 164 to the crank arms of the flaps 160 at the same level. In this manner all the shafts at any one level are interconnected for movement by a single control mechanism which comprises reduction gear unit 165 which turns gear 166 through pinion 167 and a crank arm 168 fixed to gear 166 and connected to a rod 164.

When the storage mechanism is used, all rows of flaps 160 except the bottom row are rotated clockwise until they lie against the adjacent side wall in upright position. Letters are then sorted into the bins by a sorter (not shown) similar to those already described and they fall in each bin until they lie on the lower flap. When all the letters destined for the lower compartments of the bins have been sorted into place, the flaps 160 of the second row are rotated counter-clockwise until they extend horizontally to receive and support letters. The second compartments are then filled and similar action is taken for subsequent compartments until the whole of the storage space has been utilized.

To sequence the sorted mail, the lower flaps 160 are turned counter-clockwise to dump the batches of mail 169 previously supported by them into the accumulators on the belt 170 which is mounted on pulleys 171 and 172. The belt 170 is then moved to sequence the mail, that is, collect it into a stack for running through the feeder again as in previously described operations. The sequencing belt and stacker arrangement may be of any of the types described and not necessarily of the type illustrated in FIGURE 15. When the lowest set of flaps has been cleared in this way and the batches stacked, the next set of flaps is lowered and its batches fall onto the belt for stacking. The procedure is repeated until all the rows have been stacked as required.

This storage system provides a simple and inexpensive method of storing mail for further handling when it is convenient to do so, or effectively to increase the number of available accumulators when a large number of groups are needed, without causing the sorter to be unduly lengthy by increasing the number of actual accumulators defined by the fingers on the belt.

The embodiment of the invention shown in FIGURES 16 and 17 is different from the previously discussed embodiments in that, instead of moving the accumulators to place the batches in the stacker, the necessary relative motion is obtained by moving the stacker past the accumulators to gather the groups. This method may be used with any type of sorter but is especially suitable for the sorters shown in FIGURES 7 to 13. Moreover, a moving stacker with the tiered storage mechanism shown in FIGURE 15 would provide a very compact and versatile sequencing sorter for use where limited floor space is available. In FIGURES 16 and 17 stationary accumulator compartments 173 having hinged flap-type bottoms 174 accumulate groups of articles 175 from a sorter (not shown). When the sorting has been completed a stacker 176 mounted on wheels 178 is moved on rails 177 to pass beneath the accumulators 173. Movement is controlled by an electric motor 179 driving through sprockets 181 and 182 and chain 183 to a gear 180 meshing with rack 185 which is secured to one of the rails 177.

As the stacker comes into position in article-transferring relationship to an accumulator 173, its bottom 174 is pivoted on hinge pin 186 by a synchronising means consisting of an arm 174a connected to bottom 174 and actuated by rod 174b projecting from the movable stacker assembly, so that the batch of articles 175 falls to the platform 187 attached in cantilever fashion to a belt 188 of stacker 176. Belt 188 moves about pulleys 189, 190 and 191, its movement being controlled by a photocell device 192 which controls the supply of power to a motor 193 which drives pulley 191 through sprockets 194 and 195 and chain 196. Positive control of the belt 188 is maintained through teeth 197 on the belt which mesh with teeth 198 on each of the pulleys. When the platform 187 is empty it is in a position near the top of the stacker. As each batch of articles is received the light beam to the photocell 192 is broken and the platform moves down until the beam is clear and so makes way for the succeeding batches. When all of the batches are stacked in this way, the composite stack may be removed for further sorting or handling as desired.

The details of construction and operation of the letter traps 6 will now be explained with the aid of FIGURES 18 to 24. Referring firstly to FIGURES 18 and 19, the letter trap 6 will be seen to consist of a trap assembly 225 attached to a carriage assembly 226 which guides and supports the trap assembly throughout the movements. The frame 202 of the carriage assembly 226 is connected to the chain conveyor 5 by a link 203. Doubly flanged rollers 205a and 205b are freely pivotally mounted each at a respective end of the frame 202 by pins 227 and 228 and each embraces a track 207. To form a triangular array with rollers 205a and 205b, a pair of axially spaced, coaxial flanged rollers 204a and 204b are freely pivoted on a pin 229 mounted at the free end of an arm 233 which itself is swingably mounted about a pin 230, a compression spring 231, extending between arm 233 and a stop 232 on the frame 202, urging rollers 204a and 204b against tracks 206a and 206b. Spring 231 provides the necessary resilience to accommodate minor variations in horizontal spacing between tracks 206a and 206b and 207. A second spring 234 extends between the rollers 204a and 204b to accommodate minor variations in vertical spacing between tracks 206a and 206b.

A further roller 237 is mounted on the frame 202 to turn freely about a horizontal axis beneath the carriage assembly, such roller 237 engaging a fixed platform 238 to provide further support for the letter trap and minimize frictional wear of the other rollers.

The trap assembly 225, which consists of a frame 208 and various parts mounted thereon, is shown substantially by itself in FIGURE 20 to which attention is now directed. Frame 208 carries a first jaw member 219 pivoted as a bell crank lever about a pin 243, and a second, cooperating jaw member 220 which is independently mounted, also as a bell crank lever, about the same pin 243. The inner end of the jaw member 219 is pivotally connected by a pin 250 to one end of a link 251 which is pivotally connected at its other end by a pin 252 to a lever 253 and which carries a cam follower roller 254 near its centre. The lever 253, which turns about mounting 255 by which the frame 208 of the trap assembly 225 is pivotally connected to the carriage assembly 226, also carries a cam follower roller 256. A similar lever 253a is mounted in the same manner on the remote side of the frame 208 and is not visible in FIGURE 20; it appears however in FIGURE 19 and in FIGURE 21C which shows the operation of the parts diagrammatically, which will later be described. This second lever 253a carries a cam follower 256a and is connected to one end of a link 251a (FIGURE 21C), which link normally lies parallel with the link 251 and is connected at its centre to the pin 257 of cam follower 254 so as to move therewith. At its other end the link 251a is pivotally connected by pin 250a (FIGURE 21C) to the jaw member 220. A coil compression spring 258 acts between a fixed stop 259 and a yoke 260 which bears against members 219 and 251a urging them into the rest position seen in FIGURE 20.

As best seen in FIGURE 19, the pin 257 of cam follower 254 projects downwardly from the trap assembly 225 for engagement by a trigger cam 235. FIGURE 19 shows this cam in inoperative position. Whenever a letter trap 6 travels past an accumulator station at which the cam 235 is in this inoperative condition, the pin 257 remains in its lower position, so that cam follower 254 fails to engage cam 213 (see also the perspective view of FIGURE 22). The letter trap thus travels past such accumulator, without depositing the letter which it is carrying.

When it is desired to deposit the letter, the cam 235 associated with the selected accumulator is moved at the correct time to its operative position—that is to extend vertically in FIGURE 19. A manner in which the selected cam may be so moved is described in copending United States patent application No. 56,925, filed September 19, 1960, now Patent No. 3,129,824 (especially FIGURE 7). When a cam 235 thus stands vertically, it is engaged by the lower end of the next pin 257 to pass along the track, and this engagement causes the pin 257 to be pushed vertically upwards so that the cam follower 254 which the pin 257 bears is brought into the plane of fixed cam 213. The shape of this cam 213 is best seen in FIGURES 22 and 23.

As the cam follower 254 is urged by such cam 213 to the right in FIGURE 19 or FIGURE 22 (upwardly in FIGURES 21A to 21D) it will reach the position of FIGURE 21A by the time cam follower 256 has moved along the cam 213 to the line A in FIGURE 23. The effect of this action is to begin to turn the whole trap assembly 225 about its mounting 255 on the carriage assembly 226 and thus move the jaw members 219, 220 into projected position to enter the stacker 261 which is generally similar to the stacker disclosed in said U.S. application 56,925, now Patent No. 3,129,824, except that its front face panels 262 are rather more curved, and the letters 263 lie therein at an inclination to the direction of travel of the conveyor belt 5.

At approximately line A in FIGURE 23, cam follower 256a is brought into engagement with cam 215a and is pushed in the reverse direction from cam follower 254. By virtue of the coupling effect of yoke 260 at the end of spring 258, cam follower 256 and its associated link 251 move with cam follower 256a and its link 251a. The effect of this action is shown in FIGURE 21B which demonstrates the positions occupied by the parts by the time line B of FIGURE 23 has been reached by cam followers 256 and 256a. Jaw members 219, 220 remain together, so as still to hold a letter, but their angle of inclination, as an assembly, is tilted to conform to the angle of the face panels 262 of the stacker 261. The jaw members will have penetrated the stacker by this time and will be about to engage the letters 263 to move these back to accommodate the new letter about to be deposited. By this method of entering the stacker at an inclination to the plane of letters already in the stacker, the chance of damage or bending of a letter is reduced.

By the time the cam followers 256 and 256a reach line C of FIGURE 23, cam follower 256a has been allowed to return almost to its original position, and cam 215 has engaged and moved follower 256, with the result seen in FIGURE 21C, namely straightening up of the jaw assembly and movement of jaw member 220 relative to jaw member 219 to open the jaw assembly, since, in this condition, the yoke 260 does not couple the two links 251 and 251a. At this stage the new letter will just have been brought into proper position in the stacker, and will be retained therein as the jaw assembly releases it.

Finally, at line D in FIGURE 23, the parts take up the position of FIGURE 21D, with the jaw assembly closed again; and after that all the cams taper off. Beyond these views, a fixed cam surface (not shown) will engage the upper end of pin 257 to return it to its lower position.

Many modifications and changes may be made and other applications of the invention made within the scope of the invention which is defined in the appended claims.

I claim:

1. Apparatus comprising a pluarilty of carriers each for traismitting movement to an individual flat article, means mounting said carriers for movement successively along a primary path of travel, a plurality of accumulators for receiving said articles, means mounting said accumulators spaced apart along and adjacent said path of travel, means for deflecting each said article carrier laterally from said primary path of travel into a deflected path of travel associated with a selected accumulator, each said accumulator including spaced stop means extending across its associated deflected path of travel to engage and detain an article carried into such accumulator by an article carrier while allowing unimpeded passage to said article carrier through such accumulator, a stacker, means for moving said accumulators relative to said stacker to present said accumulators sequentially to said stacker for transfer of batches of articles accumulated in said accumulators successively to said stacker.

2. Apparatus according to claim 1, wherein each said letter carrier includes a forwardly projecting resilient member positioned to engage articles already retained in an accumulator and to force such articles backwardly into the accumulator to prepare such accumulator to receive the article carried by such carrier.

3. Apparatus according to claim 1, wherein said stacker includes spaced stop means extending across the path of travel of said accumulators relative to said stacker to engage and detain a batch of articles carried into said stacker by an accumulator while allowing unimpeded passage to said accumulator through said stacker.

4. Apparatus according to claim 3 wherein each said accumulator includes a forwardly projecting resilient member positioned to engage articles already retained in the stacker and to force such articles backwardly into the stacker to prepare such stacker to receive the batch of articles carried by such accumulator.

5. Apparatus according to claim 1, including an endless belt having a span positioned to extend below and adjacent said accumulators so that articles retained in said accumulators rest on said belt span, and means for driving said belt span in the direction towards said stacker at a speed at least as great as the speed of movement of said accumulators relative to said stacker.

References Cited by the Examiner

UNITED STATES PATENTS

| | | | |
|---|---|---|---|
| 2,689,657 | 9/54 | Lens | 214—11 |
| 3,024,904 | 3/62 | Gray | 209—74 |
| 3,129,824 | 4/64 | Levy | 214—11 |

GERALD M. FORLENZA, *Primary Examiner.*

MORRIS TEMIN, *Examiner.*